(12) United States Patent
Ekstrom et al.

(10) Patent No.: US 7,887,624 B2
(45) Date of Patent: Feb. 15, 2011

(54) GAS CONCRETE SAW FILTRATION SYSTEM

(75) Inventors: Erik Ekstrom, Woodstock, MD (US); Craig A. Schell, Baltimore, MD (US); William Kalbfleisch, Owings Mills, MD (US); Eric L. Bernstein, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 1134 days.

(21) Appl. No.: 11/537,194

(22) Filed: Sep. 29, 2006

(65) Prior Publication Data

US 2007/0079589 A1 Apr. 12, 2007

Related U.S. Application Data

(60) Provisional application No. 60/725,611, filed on Oct. 11, 2005.

(51) Int. Cl.
*B01D 46/42* (2006.01)

(52) U.S. Cl. .................. 96/421; 55/385.1; 55/DIG. 34; 83/168; 173/71; 173/73; 116/268; 116/271; 116/275; 116/DIG. 25

(58) Field of Classification Search .................. 55/302, 55/DIG. 34, 385.1, 529; 96/414, 416, 417, 96/421, 424; 116/268, 275, 271, DIG. 25; 454/139, 158; 451/87, 88, 270, 354, 357, 451/451, 453, 456; 173/71, 73; 83/168
See application file for complete search history.

(56) References Cited

U.S. PATENT DOCUMENTS

| | | | |
|---|---|---|---|
| 2,048,911 A | | 7/1936 | Zimmerman |
| 2,493,164 A | * | 1/1950 | Rose .......................... 116/268 |
| 2,594,456 A | | 4/1952 | Kroenlein |
| 2,746,416 A | * | 5/1956 | Aufderheide ............... 116/275 |
| 3,027,865 A | * | 4/1962 | Kautz et al. .................. 116/268 |
| 3,160,908 A | | 12/1964 | Peabody et al. |
| 3,611,337 A | * | 10/1971 | Balzer et al. ................. 340/607 |
| 3,797,064 A | | 3/1974 | MacFarland |
| 3,841,067 A | | 10/1974 | Kato et al. |
| 3,855,976 A | | 12/1974 | Notaras et al. |
| 3,893,240 A | | 7/1975 | Morner et al. |
| 3,898,414 A | | 8/1975 | Hawley |
| 3,938,971 A | | 2/1976 | McClure |
| 4,006,033 A | | 2/1977 | Schewe |

(Continued)

FOREIGN PATENT DOCUMENTS

DE 37 08 756 9/1988

(Continued)

*Primary Examiner*—Duane Smith
*Assistant Examiner*—Minh-Chau Pham
(74) *Attorney, Agent, or Firm*—Harness, Dickey & Pierce, P.L.C.

(57) ABSTRACT

A filtration system for a gas powered concrete saw allows the user to inspect and/or determine how much dust is accumulated in the filter. In addition, manual filter cleaners are provided to allow the user to easily clean the filter without needing to open up the tool. In addition, the system is provided to deactivate the tool or notify the user if no filter is being utilized, or the filter is damaged. The system can also provide system lock out in the case of a missing or damaged filter. In addition, automatic methods are also provided to allow cleaning of the filter.

15 Claims, 6 Drawing Sheets

U.S. PATENT DOCUMENTS

| | | | |
|---|---|---|---|
| 4,142,503 A * | 3/1979 | Hatz et al. | 123/198 D |
| 4,246,011 A | 1/1981 | Oberdorfer | |
| 4,345,353 A | 8/1982 | Sommerfeld | |
| 4,370,153 A | 1/1983 | Russell et al. | |
| 4,443,235 A | 4/1984 | Brenholt et al. | |
| 4,661,129 A | 4/1987 | Nederman | |
| 4,783,207 A | 11/1988 | Nagashima et al. | |
| 4,787,922 A * | 11/1988 | Kulitz | 96/57 |
| 4,861,359 A | 8/1989 | Tettman | |
| 4,932,490 A | 6/1990 | Dewey | |
| 5,034,041 A * | 7/1991 | Austin | 55/385.1 |
| 5,080,701 A * | 1/1992 | Howard et al. | 55/356 |
| 5,194,077 A | 3/1993 | Bargiel et al. | |
| 5,271,751 A | 12/1993 | Lägler | |
| 5,342,433 A | 8/1994 | Avondoglio | |
| D355,482 S | 2/1995 | Grigsby, Jr. | |
| 5,505,753 A * | 4/1996 | Heysek | 96/416 |
| 5,556,441 A | 9/1996 | Courtwright et al. | |
| 5,570,751 A | 11/1996 | Courtwright et al. | |
| 5,616,157 A * | 4/1997 | Mead et al. | 96/421 |
| 5,704,956 A | 1/1998 | Loveless et al. | |
| 5,810,908 A * | 9/1998 | Gray et al. | 95/25 |
| 5,813,384 A | 9/1998 | Lavender et al. | |
| 5,829,094 A | 11/1998 | Field et al. | |
| 5,882,379 A * | 3/1999 | Johnson | 95/19 |
| 5,924,208 A | 7/1999 | Saeki | |
| 6,155,246 A | 12/2000 | Yanami et al. | |
| 6,190,442 B1 * | 2/2001 | Redner | 96/421 |
| 6,263,850 B1 | 7/2001 | Winmill et al. | |
| 6,315,821 B1 * | 11/2001 | Pillion et al. | 96/416 |
| 6,391,073 B1 | 5/2002 | Koga | |
| 6,508,868 B2 * | 1/2003 | Pillion et al. | 96/416 |
| 6,514,131 B1 * | 2/2003 | Reich et al. | 451/344 |
| 6,561,287 B2 | 5/2003 | DeBlasio | |
| 6,598,263 B2 | 7/2003 | Boles et al. | |
| 6,638,329 B2 | 10/2003 | Gerold | |
| 6,743,281 B1 * | 6/2004 | Miller | 96/416 |
| 6,752,846 B2 | 6/2004 | Rotter et al. | |
| 6,863,044 B2 | 3/2005 | Nakamura et al. | |
| 6,994,070 B2 | 2/2006 | Taomo et al. | |
| 6,995,698 B2 | 2/2006 | Suh et al. | |
| 7,152,276 B2 | 12/2006 | Jin et al. | |
| 7,186,281 B2 | 3/2007 | Cheng | |
| 7,470,360 B2 * | 12/2008 | Berry et al. | 210/90 |
| 7,485,168 B2 * | 2/2009 | Goupil, Jr. | 55/385.1 |
| 7,497,886 B2 * | 3/2009 | Walker | 55/385.1 |
| 7,537,648 B1 * | 5/2009 | Karwacki et al. | 96/416 |
| 2006/0260281 A1 | 11/2006 | Peng | |
| 2007/0079589 A1 | 4/2007 | Saeki | |
| 2007/0199554 A1 | 8/2007 | Jakobsson | |

FOREIGN PATENT DOCUMENTS

| | | |
|---|---|---|
| DE | 20 2004 013 873 | 12/2004 |
| EP | 1 290 971 | 3/2003 |
| GB | 624328 | 6/1949 |
| JP | 54-107160 | 8/1979 |
| JP | 57-144017 | 9/1982 |
| JP | 59-4411 | 11/1984 |
| JP | 63-158113 | 7/1988 |
| JP | 2-280810 | 11/1990 |
| JP | 53-31264 | 12/1993 |
| WO | WO 2007-141712 | 12/2007 |

* cited by examiner

GAS CONCRETE SAW FILTRATION SYSTEM

CROSS-REFERENCE TO RELATED APPLICATIONS

This application claims the benefit of U.S. Provisional Application No. 60/725,611, filed on Oct. 11, 2005. The disclosure of the above application is incorporated herein by reference.

FIELD OF THE INVENTION

The present invention relates to gas concrete saws, and more particularly, to a filtration system for use with a gas concrete saw.

BACKGROUND AND SUMMARY OF THE INVENTION

Gas concrete saws are used in very harsh environments. Concrete saws are typically provided with a water cooling system that sprays water in the area of the concrete saw blade so that the water can cool the blade and can further reduce the amount of dust created by the sawing process. Very often, these types of concrete saws are used without the water cooling feature because of environmental "run off" issues, lack of water supply, or the extra hassle of connecting to a water supply. Without the water cooling, the tool creates a very dusty environment in which the tool must operate. Engine compression of the gas concrete saws is quickly lost if the air is not filtered before entering the engine. Therefore, most gas concrete saws are provided with filters and many have several layers of filters to clean the air.

There are several problems with the filtration systems in place today. These problems include the filters clogging frequently without the user having a good way of knowing how clogged the filter is. The only indication is from the performance drop off of the tool. The user has to open up the tool to clean the filter with some portions requiring tools for obtaining access to the filter. Furthermore, there are no lock-offs to prevent the user from running a tool without a filter. This can be especially important to a tool rental shop because the users may not understand the importance of the filters, and the rental tools can be permanently damaged if used improperly.

Accordingly, the present invention provides systems for allowing the user to inspect and/or determine how much dust is accumulated in a filter. In addition, manual filter cleaners are provided to allow the user to easily clean the filter without needing to open up the tool. In addition, the system is provided to deactivate the tool or notify the user if no filter is being utilized, or the filter is damaged. The system can also provide system lock out in the case of a missing or damaged filter. In addition, automatic methods are also provided to allow cleaning of the filter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 7:
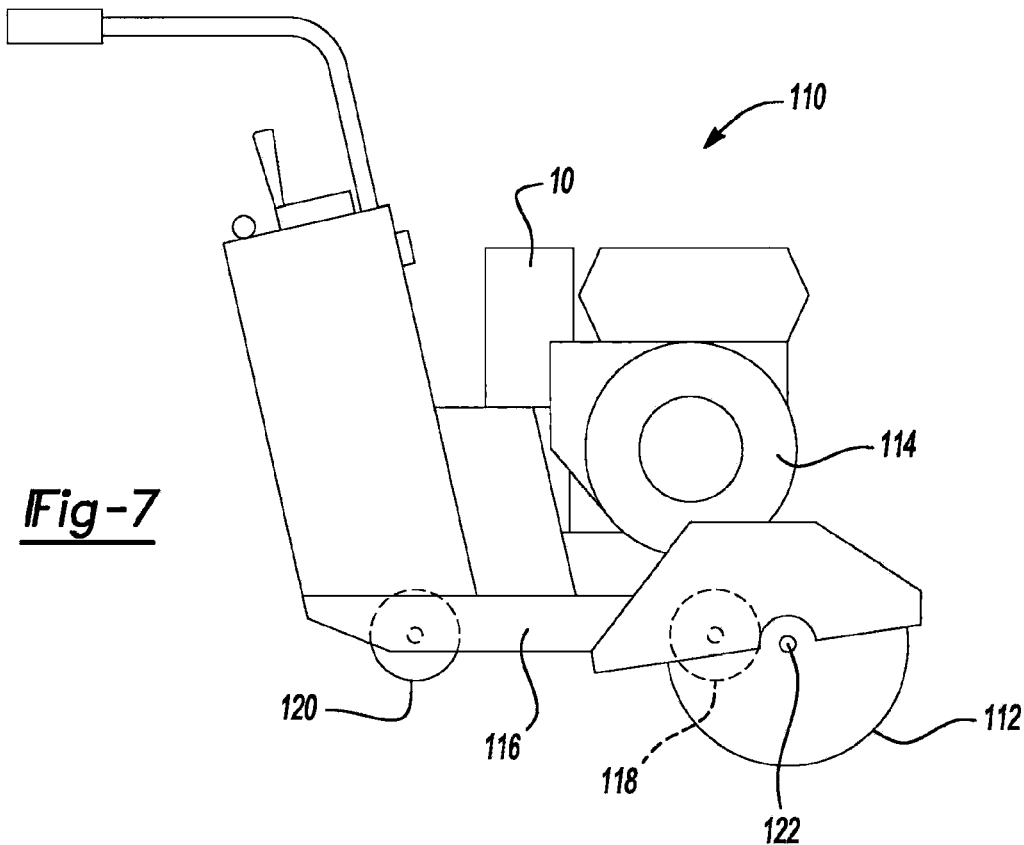
FIG. 7 is a side view of an exemplary concrete saw.
Figure 8:
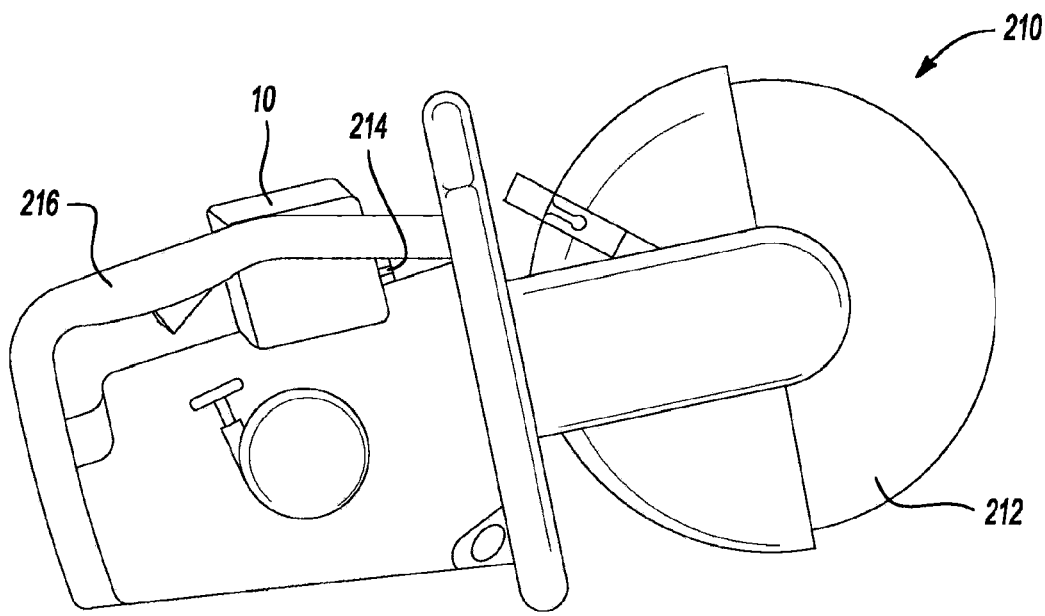
FIG. 8 is a side view of an alternative concrete saw.

With reference to FIG. 7, an exemplary concrete saw 110 is shown including a blade 112, an engine 114, a frame 116, and a set of front wheels 118 and rear wheels 120. Saw blade 112 is mounted to a spindle 122 that is selectively coupled for driving engagement with the engine 114. An air filtration system 10 is provided for filtering the air delivered to engine 114. Alternatively, a handheld concrete saw 210 is shown in FIG. 8 including an engine 214, a blade 212, a handle 216, and an air filtration system 10.

Figure 1:
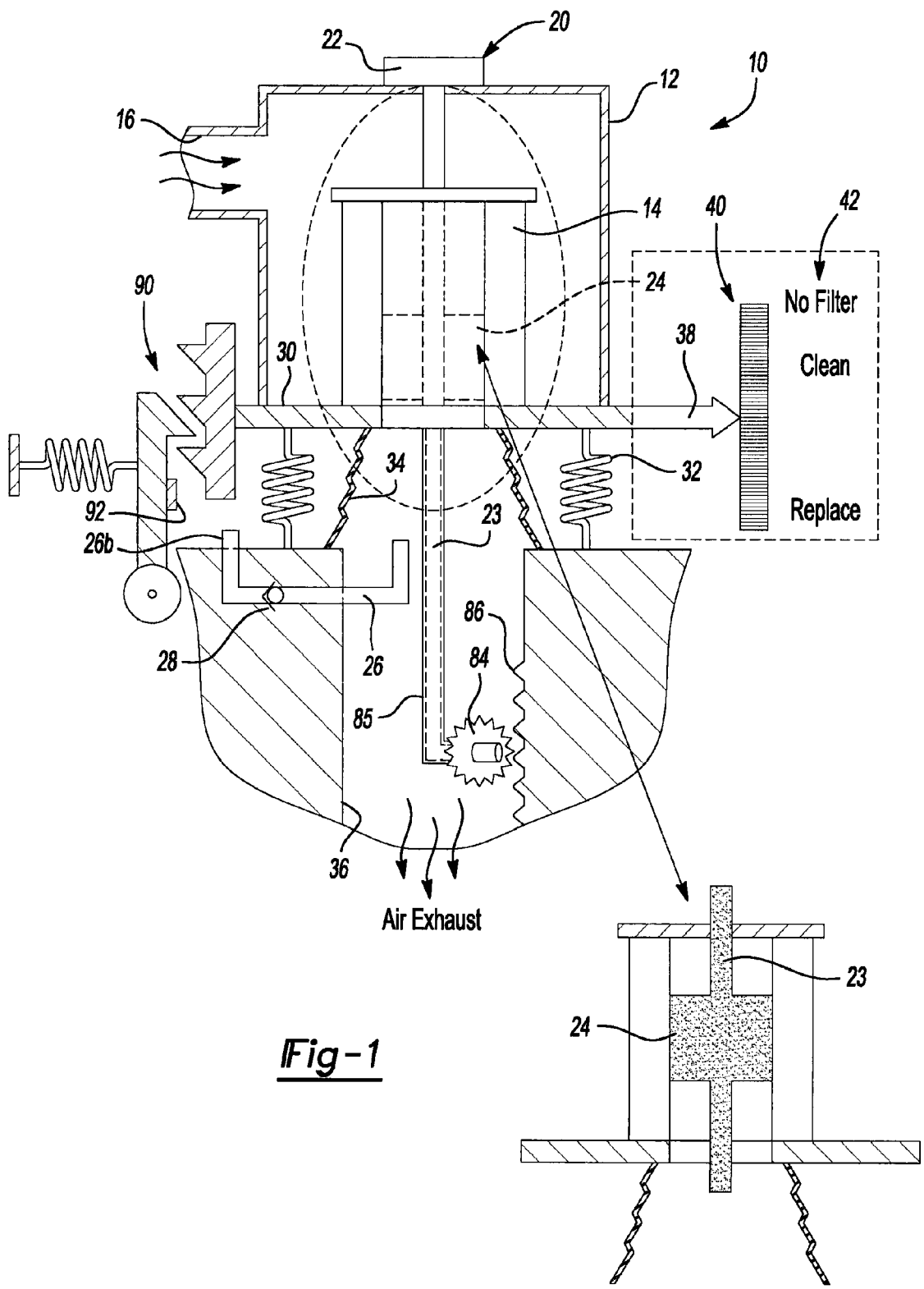
FIG. 1 is a schematic diagram of a gas concrete saw filtration system according to a first embodiment according to the principles of the present invention.

With reference to FIG. 1, a gas concrete saw filtration system 10 according to the principles of the present invention will now be described. The filtration system 10 may include a filter chamber 12 made from a transparent or translucent material so that the user can see the amount of dust that is accumulating on the surface of the filter 14. The filter chamber 12 can include an inlet 16 that is shaped such that the air is coming in at an angle generally tangential to the filter chamber 12. The angled inlet causes the heavier particles to stay to the outside of the chamber and not clog the filter 14. The filter 14 and filter chamber 12 are preferably provided with an axis-symmetric design, with the filter 14 being made out of a pleated material, such as paper or gore-type filter material. The filter chamber 12 should be either removable via twist-lock or clamp or could have a door that could be opened to remove the debris.

A manual filter cleaner 20 is provided including a knob 22 that would be accessible to the user at the top of the filter chamber 12. The knob 22 would be attached to a shaft 23 that is attached to a "flicking" piece 24. The flicking piece 24 can be located internally or externally to the filter. Its function is to rub against the pleats of the filter 14 and vibrate the debris loose from the filter when the knob 22 is turned and the flicking piece 24 rubs against the filter 14.

According to a further embodiment, an air hose tap 26 is placed running from downstream of the filter 14, between the filter 14 and the engine intake to the outside of the tool. Outer end 26*b* of the air hose tap 26 would have a check valve 28 that only allows air to flow from the outside of the tool to the inside. If the user wants to clean the filter, they can blow air into the hose 26 either manually or using compressed air. This would create a high pressure on the inside of the filter 14 and blow the debris off of the outside of the filter 14. The air hose tap 26 can be utilized in combination or separate from the manual cleaner 20 described above.

As the filter 14 collects debris, the suction force on the inside of the filter 14 increases. The inherent changes in force can be utilized to develop filter cleanliness indicators. Even clean filters have a pressure drop. Therefore, if a user does not put a filter on the tool, or if the filter has a hole caused by damage, the suction force between the engine and where the filter should be, is very low. This principle can be used to warn the user that no filter is in place or that the filter is damaged.

According to one aspect of the present invention, as illustrated in FIG. 1, the filter 14 and its base 30 are mounted on springs 32. A flexible rubber bellows 34 seals the airflow path from the inside of the filter 14 to the engine intake 36. A pointer 38 is mounted to the filter base 30 and is lined up with a gauge 40 which is visible to the user. As the suction force increases due to the filter 14 getting dirtier, the springs 32 compress and the base 30 lowers. Therefore, the pointer 38 moves, and the user sees this on the indicator gauge 40. If there's no filter or a damaged filter, less force would be on the base, and the pointer would raise to the no filter warning indicator 42.

Figure 2A:
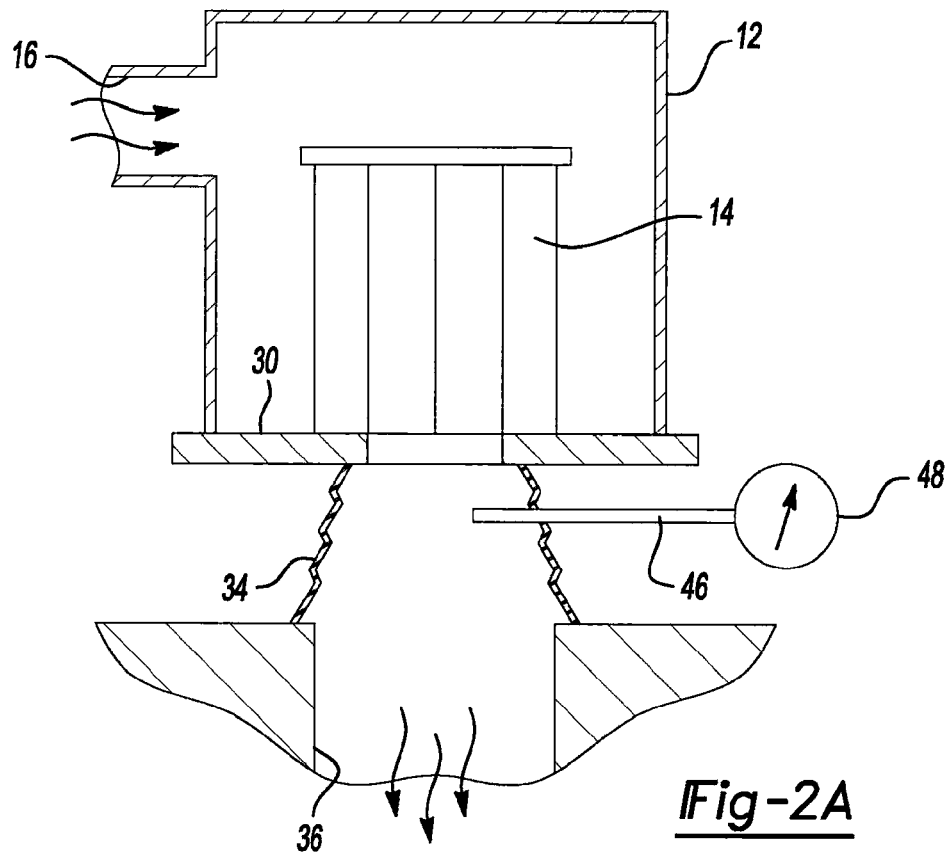
FIG. 2A is a schematic diagram of a gas concrete saw filtration system according to a second embodiment according to the principles of the present invention.

According to still a further embodiment, as shown in FIG. 2A, a pressure tap 46 is provided in communication with the air inlet passage downstream of the filter 14. The pressure tap 46 is attached to a gauge 48 on the outside of the tool. The higher the suction pressure, the dirtier the filter is. A really low section would indicate to the user a damaged or missing filter.

Figure 2B:
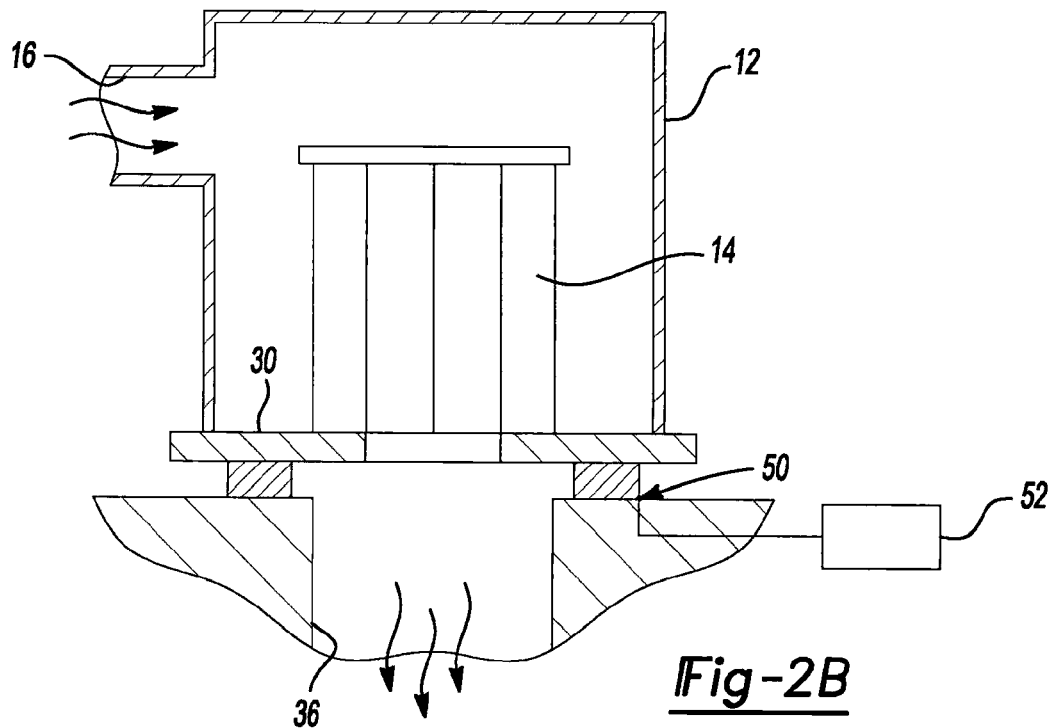
FIG. 2B is a schematic diagram of a gas concrete saw filtration system according to a third embodiment according to the principles of the present invention.

According to a still further embodiment as illustrated in FIG. 2B, an electronic pressure or force sensor 50 can be placed between the base 30 and the support structure that the filter sits in. The pressure or force sensor 50 is attached to an electronic read out 52 which displays the cleanliness level, or indicates whether a damaged or missing filter-type problem occurs.

Figure 3A:
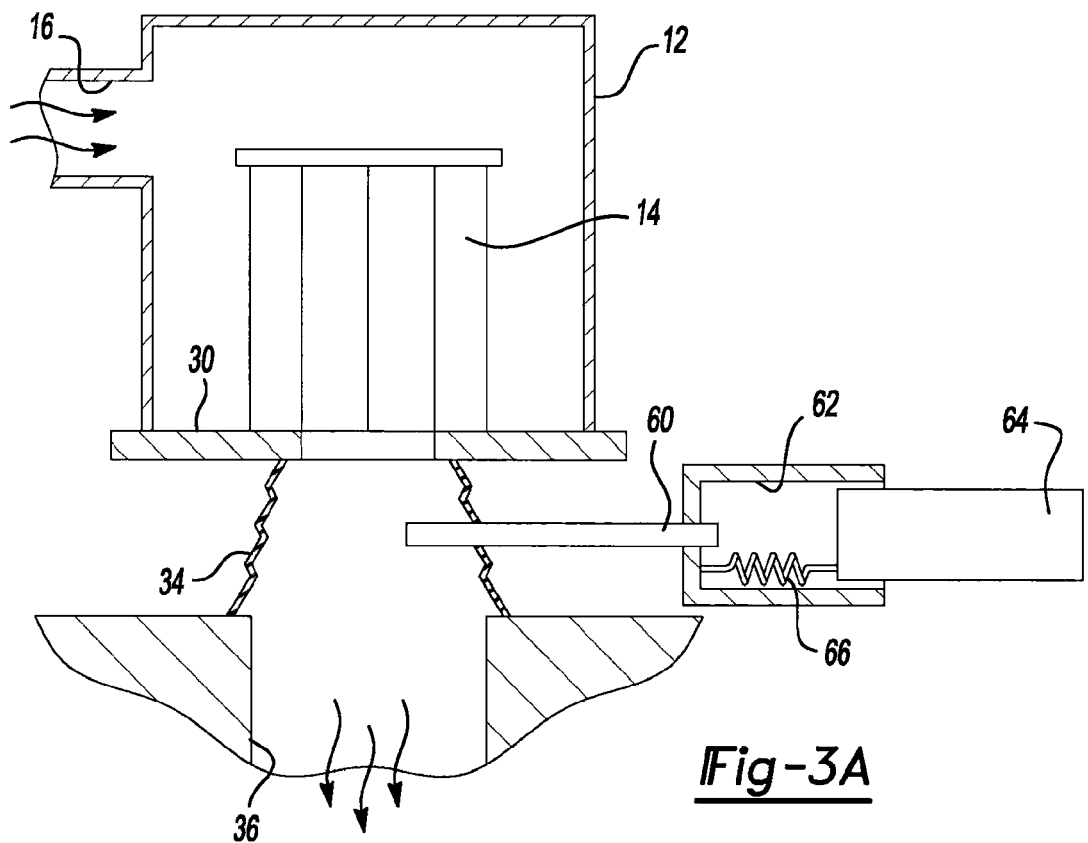
FIG. 3A is a schematic diagram of a gas concrete saw filtration system according to a fourth embodiment according to the principles of the present invention.

The same principles that are utilized for detecting filter cleanliness, a missing filter or damaged filter, can also be used to prevent the user from using the tool when the filter is missing or if the filter is damaged. With reference to FIG. 3A, a pressure tap 60 is provided in communication with the inside of the filter 14. The tap 60 is attached to a piston cylinder 62 having a movable piston 64 disposed therein with an opposing spring 66. If the suction downstream of the filter 14 is too low (filter missing or damaged), the spring 66 will keep the locking pin (piston) 64 engaged. If locking pin 64 is engaged, the gas concrete saw is deactivated by, for example, preventing the trigger from being pulled, preventing the wheel from rotating, or preventing spark from firing, or other means that would disable the concrete saw from operating.

Figure 3B:
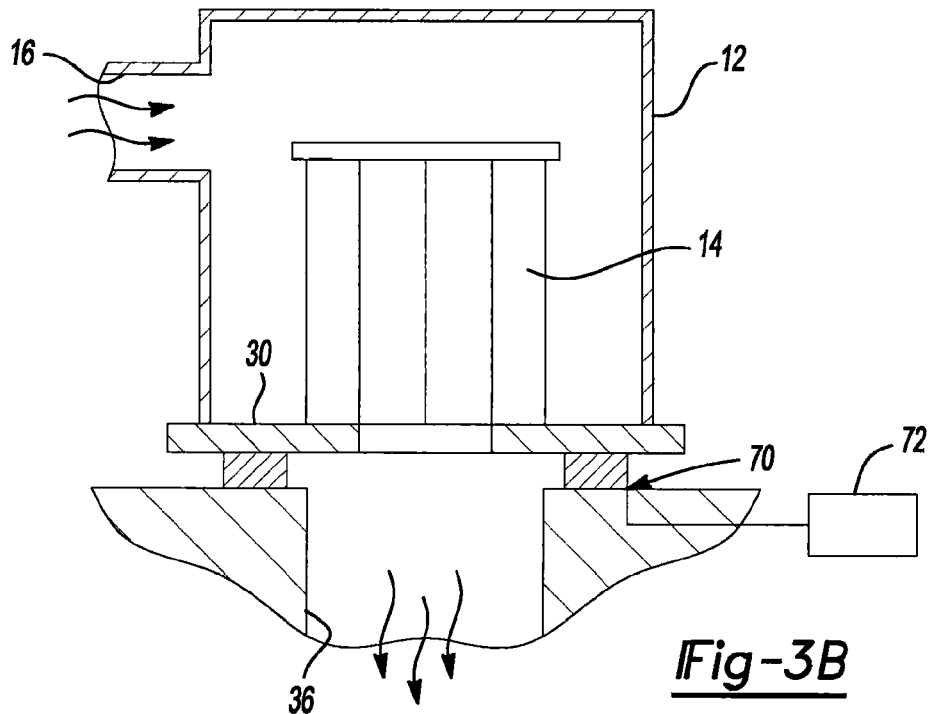
FIG. 3B is a schematic diagram of a gas concrete saw filtration system according to a fifth embodiment according to the principles of the present invention.

With reference to FIG. 3B, an alternative embodiment is shown in which an electronic sensor indicator 70 is piped between the filter support 30 and the base that the filter sits on. The sensor 70 has the ability to detect a low suction force due to the absence of, or a damaged, filter. Electronic control system 72 can be utilized to prevent the gas concrete saw from operating such as by preventing the trigger from being pulled, the wheel from rotating, preventing the spark from firing or by other known methods of preventing operation of the gas concrete saw.

Figure 4:
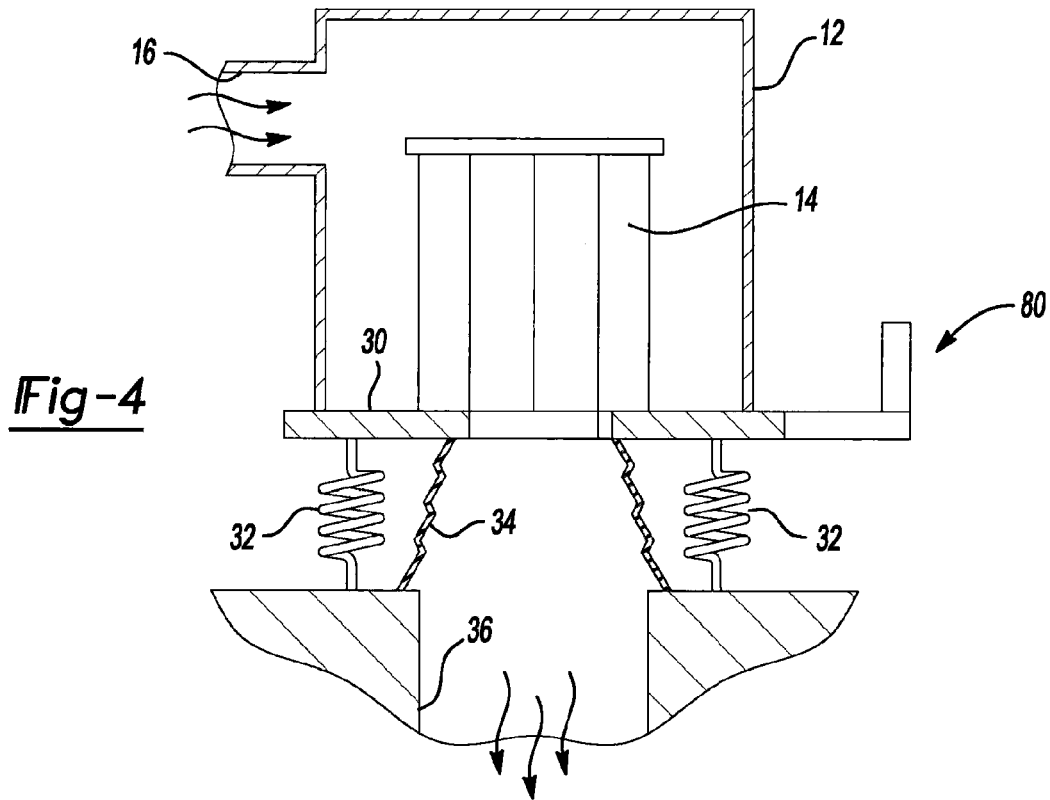
FIG. 4 is a schematic diagram of a gas concrete saw filtration system according to a sixth embodiment according to the principles of the present invention.

With reference to FIG. 4, another alternative of preventing operation of the gas concrete saw with a missing or damaged filter is provided. According to this embodiment, the filter 14 and base 30 are mounted on springs 32 with a rubber bellows 34 sealing the airflow path from the inside of the filter 14 to the engine intake 36. A locking pin 80 is mounted to the base filter 30. If the suction is too low (filter missing or damaged) the springs 32 will keep the locking pin 80 in an engaged position. If the locking pin is in the engaged position, it prevents proper operation of the gas concrete saw by, for example, preventing the trigger from being pulled, preventing the wheel from rotating, or preventing spark from firing depending on the mechanical design of the gas concrete saw.

The saw filtration system 10, as illustrated in FIG. 1, can also be provided within an automatic filter cleaning mechanism. As shown in FIG. 1, a gear 84 is added to the shaft 23 of the flicker 24 and a rack 86 is provided on a surface 36 of the engine inlet. As the suction increases inside the filter 14, the increased suction causes the base 30 to lower, the lowering of the base 30 causes the gear 84 to turn. The turning gear 84 causes the flicker to rotate and the filter is cleaned automatically. As the filter collects debris, the suction force increases, pulling the base of the filter and filter housing downward. The gear rides against a fixed rack, rotating the gear. The gear is fixed to the shaft of the flicker and the flicker rotates. A flexible shaft 23, universal joint, or bevel gear set may be required to translate the vertical rotational motion into a horizontal rotational motion. In the case of a flexible shaft 23, a rigid sheath 85 is required to hold the gear 84 in engagement with the rack 86.

If the base 30 of the filter 14 drops too slowly to effectively rotate the flicker 24, a push button cleaning method can be employed. As the base 30 drops, a latch system 90 holds the springs 32 in a compressed state. When the engine is turned off, no suction force would be pulling the filter 14 and base 30 down. At this time, the user can push a button 92, which releases the latch 90 and the springs 32 push the base 30 upwards. As the base 30 gets pushed upwards, the gear 84 rises against the rack 86, and the flicker 24 rotates, cleaning off the filter 14.

Figure 5:
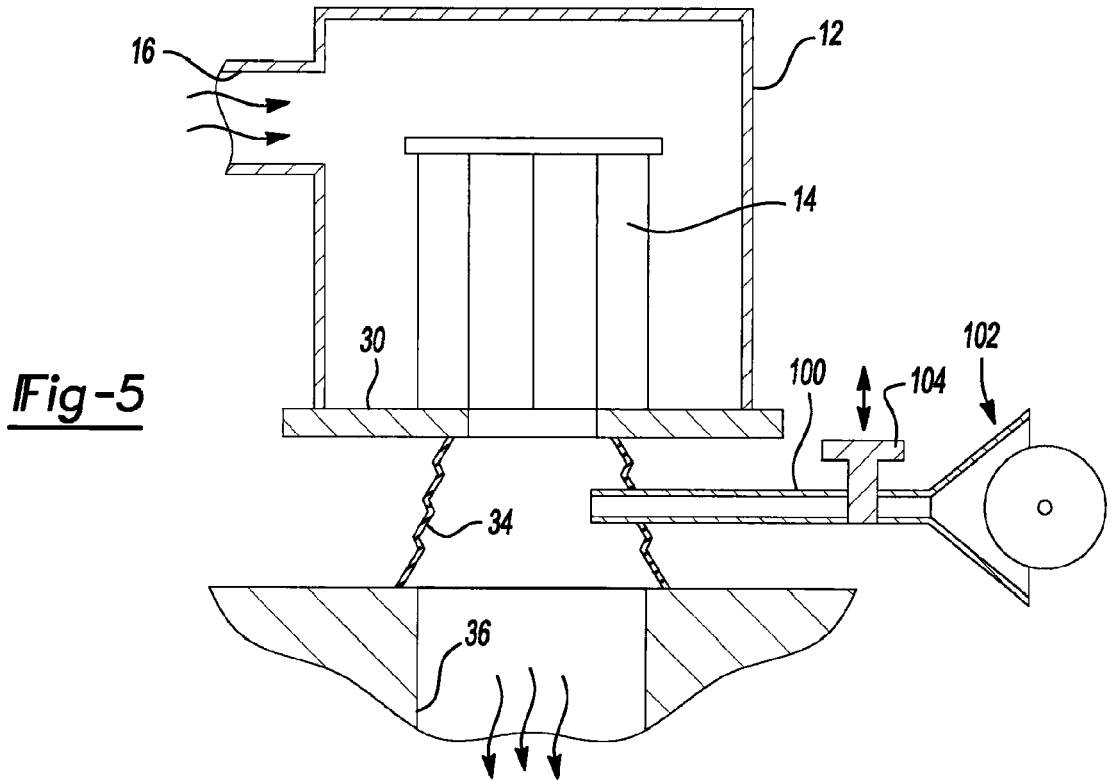
FIG. 5 is a schematic diagram of a gas concrete saw filtration system according to a seventh embodiment according to the principles of the present invention.

With reference to FIG. 5, an air tap cleaner will now be described for providing an automatic cleaning of the filter 14. An air tap 100 is placed inside of the filter 14 (between the filter and the engine). The air tap 100 is ducted to the motor cooling fan area 102. During normal operation, a plug 104 in the tap 100 prevents air from entering the tap 100. When the user wishes to clean the filter 14, they would go to a clean area (no dust in the air), and remove the plug 104 in the line 100. This would force pressurized air generated by the motor cooling fan 102 to pass from inside to outside of the filter 14, cleaning the filter 14.

Figure 6:
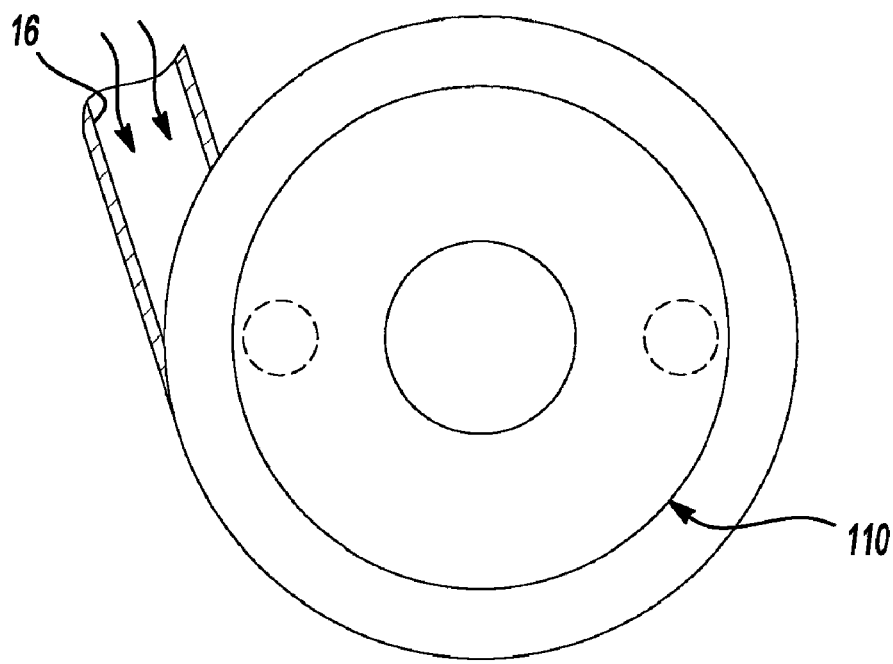
FIG. 6 is a schematic diagram of a gas concrete saw filtration system according to an eighth embodiment according to the principles of the present invention.
Figure 6:
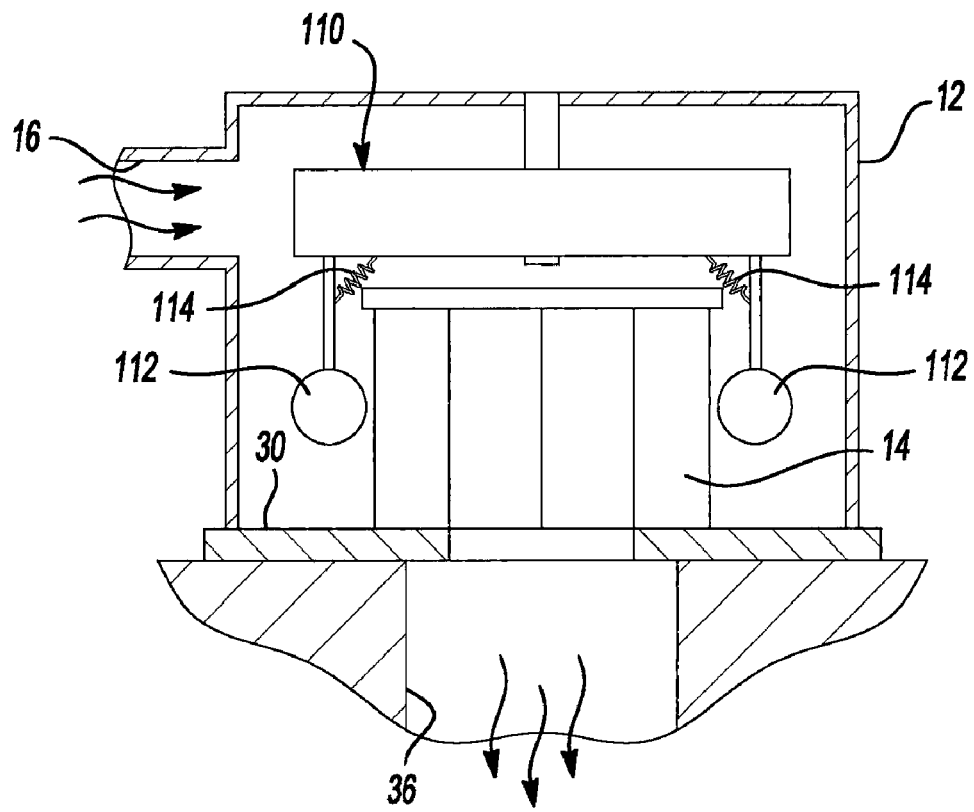

With reference to FIG. 6, a radial fan/governor automatic cleaning system will now be described. As illustrated in FIG. 6, a fan 110 is mounted to the filter canister 12. A plurality of pendulum masses 112 are hung from the fan 110 in a manner that they rest against the pleats of the filter 14. Springs 114 can be used to bias the pendulums into the filter 14. The fan 110 is positioned so that the inlet air through passage 16 causes the fan 110 to rotate. When the filter 14 is clean, the volume flow of air into the chamber is high. Therefore, the fan 110 rotates quickly, and the pendulum's 112 inertia will be larger than the spring force, and the pendulums will move outwards away from the pleats of the filter 14. As the filter 14 clogs, the airflow will decrease. The decreased airflow will cause the fan 110 to slow down and the springs 114 will overcome the inertial force of the pendulums 112. The pendulums 112 will come in and remove the debris off of the pleats of the filter 14. A derivation of this would be to keep the pendulums 112 in contact with the filter 14 at all times to prevent the build-up of debris on the filter 14.

Each of the above concepts can be used by themselves or in combination, or as one stage in a multi-stage filter system. The above concepts contribute to extending the time between filter cleanings or make it easier to clean the filters. The systems also provide the user with visual indicators of the filter presence, cleanliness, or damage level. The systems also allow the user to clean the filter without opening up the tool. The systems of the present invention also warn and prevent the user from using the gas concrete saw without a proper filter in place. This can be especially important to a tool rental shop because the users may not understand the importance of the filter. The system of the present invention also provides methods of automatically cleaning the filter so that the user does not need to take any action in cleaning the filter.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system comprising:
   a source of rotary motive power;
   an air intake structure at least partially defining an air intake passage in fluid communication with said source of rotary motive power;
   a filter support structure having an inlet and an outlet in fluid communication with said air intake passage, said filter support structure being axially movable relative to said air intake passage;
   a filter mounted to said filter support structure and disposed between said inlet and said outlet;
   a resiliently compressible member disposed between said filter support structure and said air intake structure and biasing said filter support structure axially away from said air intake passage;
   a scale having indicia of a condition of said filter; and
   an indicator connected to said filter support structure and movable relative to said scale,
   wherein said filter support structure moves axially relative to said air intake passage in response to a change in a pressure differential across said filter and causes corresponding movement of said indicator relative to said scale to indicate said condition of said filter.

2. The system of claim 1, wherein said scale includes a warning indicator that said filter is damaged or missing.

3. The system of claim 1, further comprising a plurality of resiliently compressible members disposed between said filter support structure and said air intake structure.

4. The system of claim 1, further comprising a flexible bellows disposed between said filter support structure and said air intake structure.

5. The system of claim 1, wherein said source of rotary motive power is an internal combustion engine.

6. The system of claim 5, wherein said internal combustion engine transmits motion to a saw blade.

7. The system of claim 6, wherein said saw blade is a concrete saw blade.

8. A power tool comprising:
   a material removal tool;
   an internal combustion engine transmitting power to said material removal tool;
   an air intake structure at least partially defining an air intake passage in fluid communication with said internal combustion engine;
   a filter support structure having an inlet and an outlet in fluid communication with said air intake passage;
   a filter mounted to said filter support structure and disposed between said inlet and said outlet; and
   means for indicating a cleanliness level of said filter.

9. The power tool of claim 8, wherein said filter support structure includes a base for supporting said filter, said base being movably supported by at least one spring and including a pointer movable with said base and lined up with a gauge which is visible to a user, wherein as a suction force across said filter changes due to the filter getting dirtier, said base moves against a biasing force of said at least one spring thereby causing said pointer to move relative to said gauge.

10. The power tool of claim 9, wherein said gauge includes a warning indicator for indicating to a user that the filter is damaged or missing.

11. The power tool of claim 9, wherein said base is connected to a flexible bellows.

12. The power tool of claim 8, wherein said means for indicating includes a pressure tap disposed downstream of said filter, said pressure tap attached to a pressure gauge, wherein said gauge includes an indicator associated with different cleanliness states of said filter corresponding to different pressure levels.

13. The power tool of claim 8, wherein said filter support structure includes a base for supporting said filter, said base being supported by at least one force sensor, said force sensor being connected to an indicator which electronically indicates a cleanliness state of said filter corresponding to different force levels on said force sensor.

14. The power tool of claim 8, wherein said material removal tool is a saw blade.

15. The power tool of claim 14, wherein said saw blade is a concrete saw blade.

* * * * *